US008996829B2

United States Patent
Miller et al.

(10) Patent No.: US 8,996,829 B2
(45) Date of Patent: *Mar. 31, 2015

(54) CONSISTENCY WITHOUT ORDERING DEPENDENCY

(71) Applicant: Microsoft Corporation, Redmond, WA (US)

(72) Inventors: Thomas J. Miller, Yarrow Point, WA (US); Jonathan M. Cargille, Seattle, WA (US); William R. Tipton, Seattle, WA (US); Surendra Verma, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,896

(22) Filed: Apr. 29, 2013

(65) Prior Publication Data

US 2013/0311733 A1    Nov. 21, 2013

Related U.S. Application Data

(63) Continuation of application No. 12/635,725, filed on Dec. 11, 2009, now Pat. No. 8,433,865.

(51) Int. Cl.
*G06F 12/16* (2006.01)
*G06F 3/06* (2006.01)
*G06F 9/46* (2006.01)

(52) U.S. Cl.
CPC .......... *G06F 3/065* (2013.01); *G06F 9/466* (2013.01); *G06F 3/0614* (2013.01); *G06F 3/0683* (2013.01)
USPC .......................................... 711/162; 711/141

(58) Field of Classification Search
CPC ....... G06F 9/466; G06F 3/065; G06F 3/0683; G06F 3/0614

USPC ................................................ 711/141, 162
See application file for complete search history.

(56) References Cited

U.S. PATENT DOCUMENTS

| 5,504,857 A | 4/1996 | Baird |
| 5,594,863 A | 1/1997 | Stiles |

(Continued)

FOREIGN PATENT DOCUMENTS

| CN | 1517885 A | 8/2004 |
| CN | 1776595 A | 5/2006 |

(Continued)

OTHER PUBLICATIONS

PCT International Search Report and Written Opinion for Application No. PCT/US2011/039071, Reference 329477-02, Dec. 7, 2011.

(Continued)

*Primary Examiner* — Than Nguyen
(74) *Attorney, Agent, or Firm* — John Jardine; Kate Drakos; Micky Minhas (57) ABSTRACT

Aspects of the subject matter described herein relate to maintaining consistency in a storage system. In aspects, one or more objects may be updated in the context of a transaction. In conjunction with updating the objects, logical copies of the objects may be obtained and modified. A request to write the updated logical copies is sent to a storage controller. The logical copies do not overwrite the original copies. In conjunction with sending the request, a data structure is provided for the storage controller to store on the disk. The data structure indicates the one or more objects that were supposed to be written to disk and may include verification data to indicate the content that was supposed to be written to disk. During recovery, this data structure may be used to determine whether all of the object(s) were correctly written to disk.

17 Claims, 5 Drawing Sheets

(56) References Cited

U.S. PATENT DOCUMENTS

| | | |
|---|---|---|
| 5,873,118 A | 2/1999 | Letwin |
| 5,964,835 A | 10/1999 | Fowler |
| 6,629,264 B1 | 9/2003 | Sicola |
| 6,643,672 B1 | 11/2003 | Lebel |
| 6,925,476 B1 | 8/2005 | Multer |
| 6,928,555 B1 | 8/2005 | Drew |
| 7,130,855 B2 | 10/2006 | Lebel |
| 7,334,124 B2 | 2/2008 | Pham |
| 7,440,966 B2 | 10/2008 | Adkins |
| 7,441,274 B1 | 10/2008 | Drew |
| 7,533,127 B2 | 5/2009 | Zimmerman |
| 7,552,148 B2 | 6/2009 | Liu |
| 7,617,259 B1 | 11/2009 | Muth |
| 7,620,721 B2 | 11/2009 | Suriyanarayanan |
| 7,840,752 B2 | 11/2010 | Hu |
| 8,433,865 B2 * | 4/2013 | Miller et al. ............ 711/162 |
| 2002/0078244 A1 * | 6/2002 | Howard ................ 709/248 |
| 2003/0140070 A1 | 7/2003 | Kaczmarski |
| 2004/0078396 A1 | 4/2004 | Lebel |
| 2004/0225873 A1 | 11/2004 | Diaz |
| 2004/0267699 A1 | 12/2004 | Zimmerman |
| 2005/0204108 A1 * | 9/2005 | Ofek et al. ............. 711/162 |
| 2005/0267914 A1 | 12/2005 | Moore |
| 2006/0112140 A1 | 5/2006 | McBride |
| 2008/0010515 A1 | 1/2008 | Robinson |
| 2008/0077590 A1 | 3/2008 | Pandit |
| 2008/0294700 A1 | 11/2008 | Sugimoto |
| 2009/0204752 A1 | 8/2009 | Sasaki |
| 2009/0240869 A1 | 9/2009 | O'Krafka |
| 2011/0145527 A1 | 6/2011 | Miller |
| 2011/0307449 A1 * | 12/2011 | Cargille et al. ......... 707/648 |
| 2011/0314229 A1 | 12/2011 | Miller |
| 2011/0314230 A1 | 12/2011 | Zhang |

FOREIGN PATENT DOCUMENTS

| | | |
|---|---|---|
| CN | 1936853 B | 3/2007 |
| CN | 101051324 A | 10/2007 |
| CN | 101529396 B | 9/2009 |
| JP | 2003-223350 | 8/2003 |
| JP | 2006-106868 | 4/2006 |
| JP | 2007-316944 | 6/2007 |
| JP | 2009-282752 | 3/2009 |

OTHER PUBLICATIONS

Calin, "Fast file writes without having large data flushes to disk", eggheadcafe.com, Mar. 23, 2007.
"Xbox 360 HDD cache clear code discovered [update 1]—Joystiq", Jun. 9, 2006.
Riska, "Disk Drive Level Workload Characterization", Proceedings of the 2006 USENIX Annual Technical Conference, May 30-Jun. 3, 2006.
"Can not write to file in Java", LinuxQuestions.org, Retrieved Mar. 29, 2010.
"Lecture 19: Transactions: Reliability from Unreliable Components", Retrieved Mar. 29, 2010.
"Error detection and correction", From Wikipedia, the free encyclopedia, Retrieved May 6, 2010.
PCT International Search Report and Written Opinion for Application No. PCT/US2010/056311, Reference 328569-02, Jul. 18, 2011.
CN Search Report for Application No. 201180029786.4, Sep. 25, 2013.
AU Patent Examination Report No. 1 for Application No. 2010328591, Feb. 12, 2014.
JP Notice of Reason for Rejection for Application No. 2012-543128, Apr. 30, 2014.
CN First Office Action for Application No. 201080056154.2, Jun. 25, 2014.
CN Decision on Rejection for Application No. 201180029786.4, Jun. 4, 2014.

* cited by examiner

CONSISTENCY WITHOUT ORDERING DEPENDENCY

CROSS REFERENCE TO RELATED APPLICATION

This application is a continuation of and claims benefit from currently pending U.S. patent application Ser. No. 12/635,725, to Miller et al., filed Dec. 11, 2009, entitled "CONSISTENCY WITHOUT ORDERING DEPENDENCY", which application is incorporated herein by reference in its entirety.

BACKGROUND

In an effort to improve disk performance, disk manufacturers have created disks with caches. Although previously these caches were used when reading data from the disk, they have recently also been used when writing data to the disk. In particular, when an operating system requests that data be written to a disk, the disk controller may report that the data has been written before the data is actually transferred from the disk cache to non-volatile disk memory. Also, the order in which the data is written to the non-volatile disk memory may be different from the order in which the data is received by the disk controller. These behaviors are problems for systems that attempt to maintain consistency.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to maintaining consistency in a storage system. In aspects, one or more objects may be updated in the context of a transaction. In conjunction with updating the objects, logical copies of the objects may be obtained and modified. A request to write the updated logical copies is sent to a storage controller. The logical copies do not overwrite the original copies. In conjunction with sending the request, a data structure is provided for the storage controller to store on the disk. The data structure indicates the one or more objects that were supposed to be written to disk and may include verification data to indicate the content that was supposed to be written to disk. During recovery, this data structure may be used to determine whether all of the object(s) were correctly written to disk.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
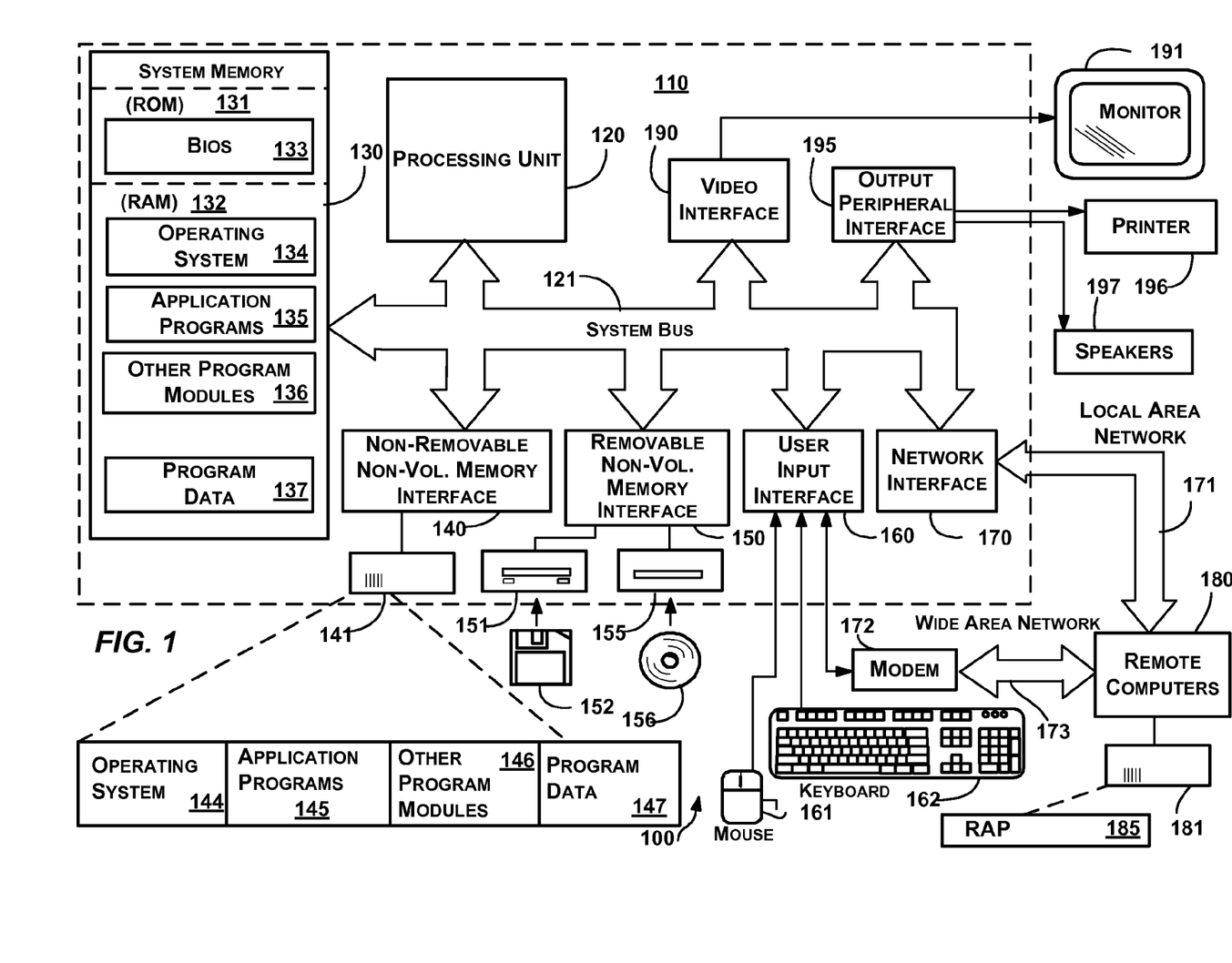
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state drives, solid state RAM, solid state ROM, hybrid devices including two or more storage media, sets of storage devices that are logically treated as a single device where each device may include similar and/or different characteristics, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

In addition to interfaces that address local storage, the interface 140 may include storage area network (SAN)-based interfaces, network addressed storage (NAS)-based interfaces, hybrid interfaces including SAN and NAS, and the like. SAN and/or NAS may use Fibre Channel, SCSI, iSCSI, PCI-X, Ethernet, USB, or some other interconnect technology to communicate with storage devices.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Consistency

As mentioned previously, caching and out-of-order writing to a disk are problems for systems that attempt to maintain consistency. Sometimes herein, the term transaction is used. A transaction is a group of operations that may include various properties including, for example, atomic, consistent, isolated, and durable. As used herein, a transaction includes at least the atomic property and may include one or more of the other properties above.

The atomic property is used to refer to a group of operations where either every operation in the group succeeds or the tangible effects (e.g., file changes) of the operations in the group are undone, discarded, or not applied. For simplicity, the term discarded is sometimes used herein to refer to taking any actions appropriate to ensure that any changes made in context of the transaction are not reflected in the objects associated with the changes. Discarding may include undoing, discarding, not applying update operations, and the like.

For example, a bank transfer may be implemented as an atomic set of two operations: a debit from one account and a credit to another account. If the two operations do not both succeed, then the transfer is either unfairly in favor of the bank or the account holder. Thus, either both operations succeed in a transaction or the tangible effects (e.g., data stored to disk or memory) of any that did succeed is discarded.

When "transaction" is used herein, it may, but does not necessarily, mean that a component involved with the transaction understands that a transaction is occurring. For example, a component may be explicitly informed that two or more objects are involved in a transaction. The component may then enforce the atomic property on operations to the objects as described above. As another example, a component may not necessarily be informed that a transaction is occurring. Instead, the component may determine or be instructed that two or more operations it has been given are either to be completed successfully or that the effects of the operations are to be discarded.

In the first example above, the component was given explicit information that the objects are involved in a transaction. In the second example, the component may not have been informed that a transaction affects the two or more operations. Rather, the component may have been instructed that it is to enforce the atomic property on the operations. Aspects of the subject matter described herein are applicable to both examples above.

Furthermore, when one or more objects are modified "in the context of a transaction", this means there is an assumption that the atomic property will be enforced with respect to the update operations issued to modify the one or more objects. For example, an application requesting modifications in the context of a transaction may safely assume that either all update operations to make the modifications will succeed or that the updates that did or would have succeeded will be discarded.

Figure 2:
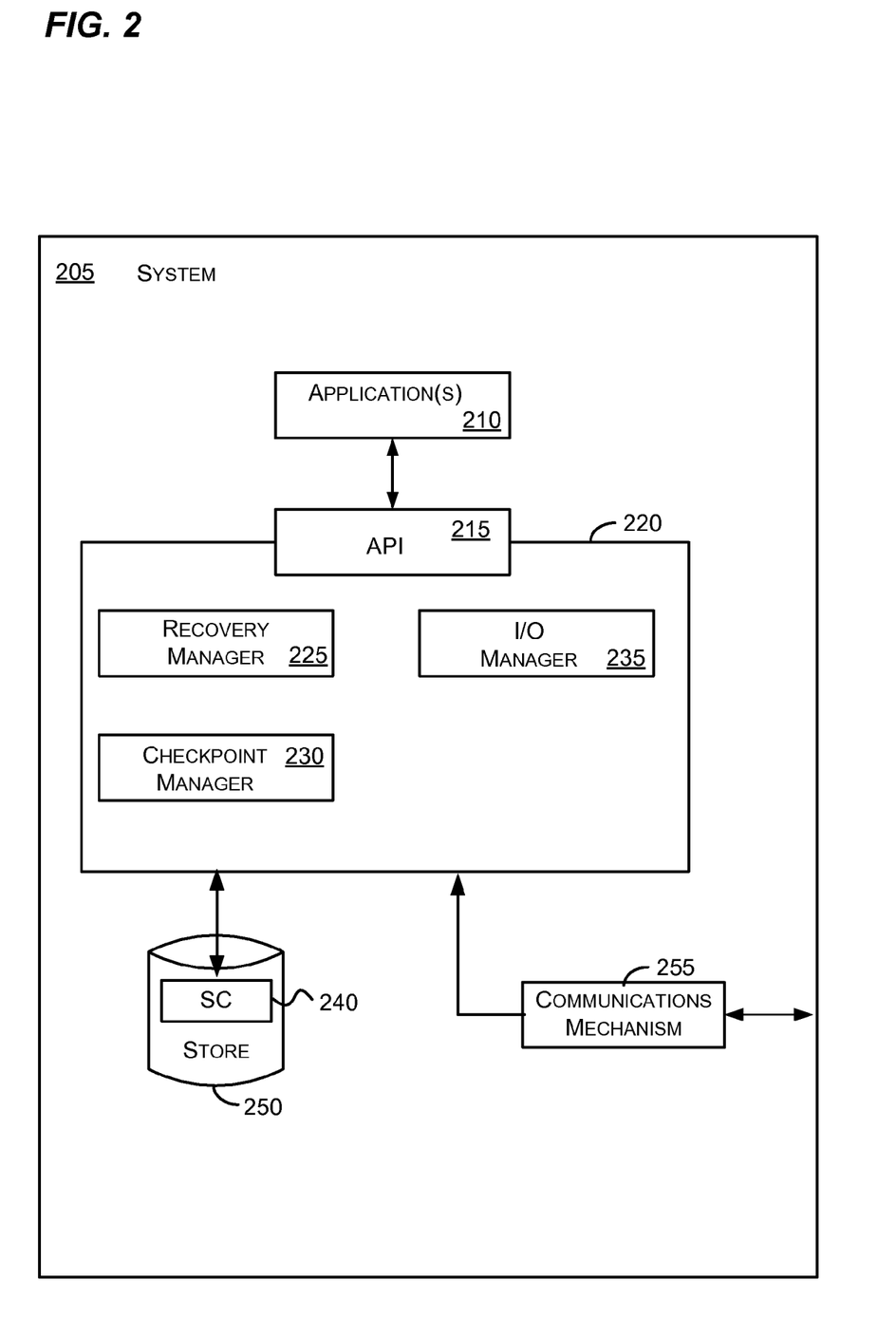
FIG. 2 is a block diagram representing an exemplary arrangement of components of a system in which aspects of the subject matter described herein may operate.

FIG. 2 is a block diagram representing an exemplary arrangement of components of a system in which aspects of the subject matter described herein may operate. The components illustrated in FIG. 2 are exemplary and are not meant to be all-inclusive of components that may be needed or included. In other embodiments, the components and/or functions described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

Turning to FIG. 2, the system 205 may include one or more applications 210, an API 215, consistency components 220, a store 250, a communications mechanism 255, and other components (not shown). The system 205 may comprise one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 205 comprises a single device, an exemplary device that may be configured to act as the system 205 comprises the computer 110 of FIG. 1. Where the system 205 comprises multiple devices, each of the multiple devices may comprise a similarly or differently configured computer 110 of FIG. 1.

The consistency components 220 may include a recovery manager 225, a checkpoint manager 230, an I/O manager 235, and other components (not shown). As used herein, the term component is to be read to include all or a portion of a device, a collection of one or more software modules or portions thereof, some combination of one or more software modules or portions thereof and one or more devices or portions thereof, and the like.

The communications mechanism 255 allows the system 205 to communicate with other entities. For example, the communications mechanism 255 may allow the system 205 to communicate with applications on a remote host. The communications mechanism 255 may be a network interface or adapter 170, modem 172, or any other mechanism for establishing communications as described in conjunction with FIG. 1.

The store 250 is any storage media capable of providing access to data. The store may include volatile memory (e.g., a cache) and non-volatile memory (e.g., a persistent storage). The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 250 may comprise hard disk storage, other non-volatile storage, volatile memory such as RAM, other storage, some combination of the above, and the like and may be distributed across multiple devices. The store 250 may be external, internal, or include components that are both internal and external to the system 205.

The store 250 may be accessed via a storage controller 240. Access as used herein may include reading data, writing data, deleting data, updating data, a combination including two or more of the above, and the like. The storage controller 240 may receive requests to access the store 250 and may fulfill such requests as appropriate. The storage controller 240 may be arranged such that it does not guarantee that data will be written to the store 250 in the order that it was received. Furthermore, the storage controller 240 may indicate that it has written requested data before the storage controller 240 has actually written the data to a non-volatile memory of the store 250.

The one or more applications 210 include any processes that may be involved in transactions to create, delete, or update resources. Such processes may execute in user mode or kernel mode. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. The one or more applications 210 may make file system requests (e.g., via function/method calls) through the API 215 to the I/O manager 235.

The I/O manager 235 may determine what I/O request or requests to issue to the storage controller 240 (or some other intermediate component). The I/O manager 235 may also return data to the one or more applications 210 as operations associated with the file system requests proceed, complete, or fail. When a file system request involves a transaction, the I/O manager 235 may inform a transaction manager (not shown) so that the transaction manager may properly manage the transaction. In some embodiments, the functions of the transaction manager may be included in the I/O manager 235.

Below, an exemplary algorithm is presented for writing data to the store 250 in a manner that facilitates consistency and recovery after failure. As presented in this algorithm, each object is denoted by $D_n$ where n identifies the object to a system. The objects are assumed to be serializable (i.e., able to be represented as data on the store 250). An object table associates each object identifier with its location on the store 250.

The first time $D_n$ is updated in a modifying transaction, $D_n$ is located by looking up its location in the object table using n. For use in this example, the storage location of $D_n$ on the store 250 is called $L_1$.

The contents of $L_1$ are then read from the store 250, the object may be de-serialized (e.g., converted from the serialized format into a structure of the object), and the portions of the object that are to be modified are copied into main system memory. The updates are performed on the portions (or copies thereof) in memory. In conjunction with the portions in memory being modified, one or more new locations (call this $L_2$) on the store 250 is designated for the modified portions.

These copies in main system memory are sometimes called herein "logical copies" of the objects. A logical copy of an object includes one or more data structures that can be used to represent the object. Logically, a logical copy is a duplicate of an object. Physically, a logical copy may include data (including pointers to other data) that may be used to create a duplicate of the object. For example, in one implementation, a logical copy may be an actual copy (e.g., bit-by-bit copy) of the object or a data structure that includes data that can be used to create the object. In another implementation, an unmodified logical copy may include one or more pointers that refer to the original object. As the logical copy is modified, pointers in the logical copy may refer to new memory locations (e.g., for the changed portion of the logical copy) while other pointers may refer to portions of the original object (e.g., for the non-changed portion of the logical copy). Using the pointers, the modified copy may be constructed using the modified data together with the non-modified data of the original object. Creating a logical copy may be performed to reduce the storage needed to create a duplicate of an object.

Furthermore, although serialization and de-serialization are sometimes referred to herein, there is no intention to limit aspects of the subject matter described herein to what is customarily thought of as serialization and de-serialization. In one embodiment, the serialized version may be bit-for-bit identical to the de-serialized version. In another embodiment, the bits of the serialized version may be packaged in a different format and order than those in the de-serialized version. Indeed, in one embodiment, serialization and de-serialization are to be understood to mean any mechanism for storing and retrieving data that represents objects from a store. The other mechanisms, for example, may include writing properties of the objects in text format to the store, encoding properties of the objects in a markup language in the store, other ways of storing properties and other features of the objects on the store, and the like.

At the system's discretion (e.g., after a transaction commits or some other time), the system may serialize the modified logical copy back to the stable medium but does so at location $L_2$. The intention to write the modified logical copy back to the new location is called a write plan. A write plan may include an arbitrary number of updates to one or more objects. A write plan may reference changes that occur in more than one transaction. Multiple write plans may be combined into a single write plan.

When a modification occurs just after a checkpoint, a block called the recovery block (which may be duplicated in multiple locations) is modified to point to the start of the modified logical copy (i.e., $L_2$). A field in the object at $L_2$ points to the location that will be written to next. This field represents a link in a chain of write plans.

In conjunction with sending a request to write the logical copy, a modification may be made to the object table. In particular, the location value indexed by the identifier of the object may be set to the value of the location at which the modified logical copy is to be stored (i.e., $L_2$). This is done so that a subsequent lookup of the location of object $D_n$ will be referred to the location $L_2$, the new version of the object.

If a transaction modifies more than one object, for example $D_i$ and $D_j$, the objects are considered to be "atomically bound"

to one another, and are written in one write plan. A write plan may specify this relationship (e.g., in links to the objects involved).

An arbitrary number of objects may be persisted in this manner. Periodically, the object table may also be written to the store 250 in the same manner as any other object.

In conjunction with sending a request to write the object table to the store 250, a flush command may also be sent to the storage controller 240. A flush command instructs the storage controller 240 to write all data from its volatile memory that has not already been written to the non-volatile memory of the store 250.

Periodically, a checkpoint may occur. A checkpoint may be indicated by a checkpoint record being stored by the store 250. A checkpoint may be written at any time and may become stable/durable after flush. Stable/durable refers to the checkpoint being stored on non-volatile memory of the store.

After a checkpoint is stable/durable, space used for any old and unused copies of objects (or portions thereof) may be reused. After the flush completes, the recovery block is then pointed to the start of a chain of the next write plans. In one embodiment, the recovery block may point the start of the chain of write plans to the new location of the object table.

Figure 3:
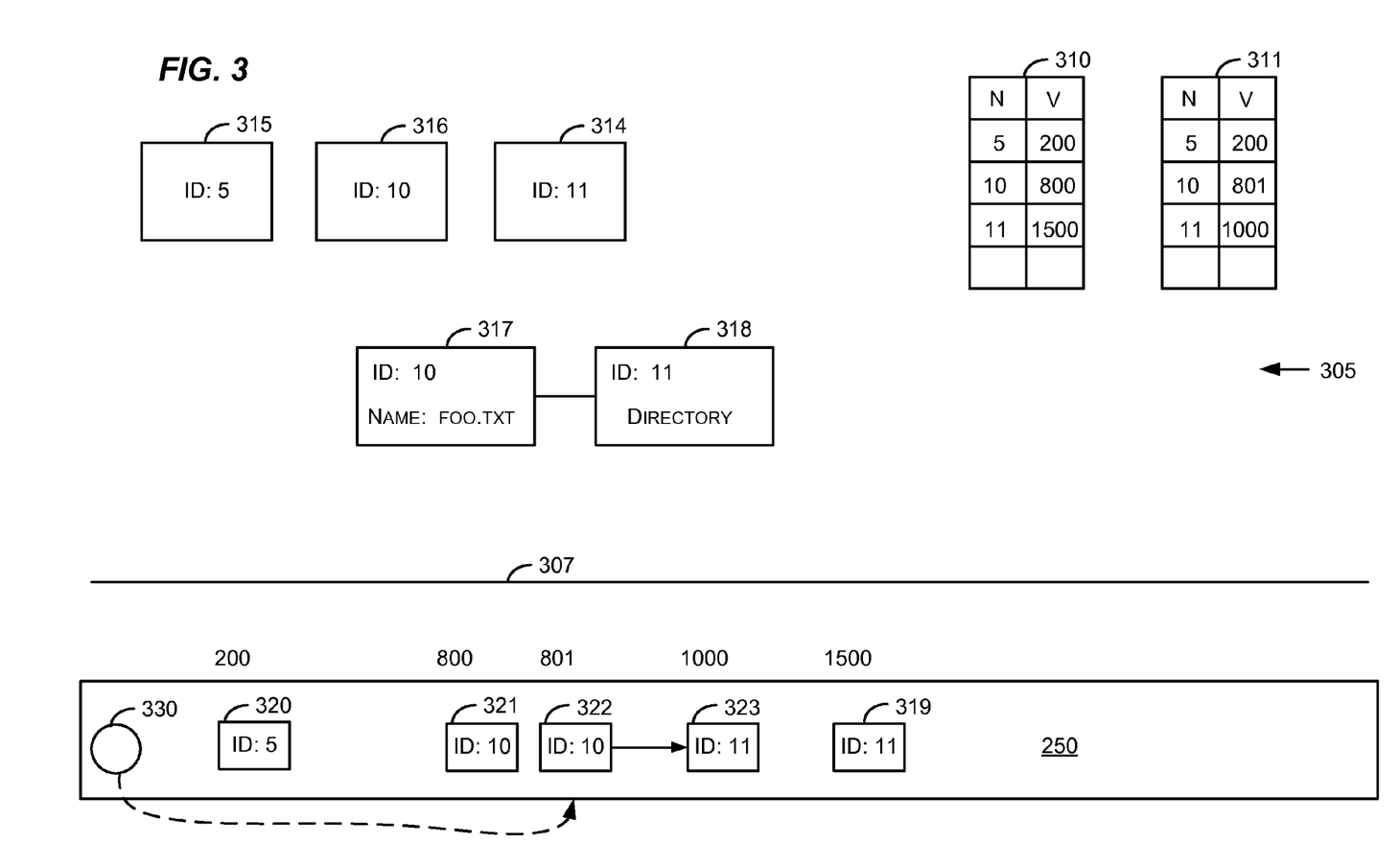
FIG. 3 is a block diagram that illustrates aspects of the subject matter described herein.

A more concrete example is described in conjunction with FIG. 3, which is a block diagram that illustrates aspects of the subject matter described herein. As illustrated, FIG. 3 shows a main memory 305 and a store 250. The line 307 represents a division between the main memory 305 and the store 250. Objects above the line 307 are in main memory while objects below the line 307 are in volatile or non-volatile memory of the store 250.

The objects 314-316 are shown in the main memory 305. In implementation, the objects 314-316 may be de-serialized logical copies of the objects 319-321, respectively. The object 319 is located at location 1500 on the store 250, the object 320 is located at location 200 on the store 250, and the object 321 is located at location 800 on the store 250.

The object table 310 includes key value pairs that indicate locations of the objects 314-316 on the store 250. The key value pairs are indexed using the identifiers (n) of the objects 314-316.

When a transaction modifies the object 316 (e.g., by changing its name to foo.txt), the consistency components (e.g., the consistency components 220 of FIG. 2) may determine a new storage location for the updated object (e.g., location 801). If the object is a file, updating its name in the context of a transaction may also cause the directory that includes the file to also be involved in the transaction. For example, when a file name is changed, both the object that represents the file and the object that represents the directory that includes the file may need to be involved in the transaction. In this case, the directory that includes the object is represented as object 314 and a logical copy of the updated directory (e.g., object 318) is represented as object 323 in the store 250. Also, the table 310 has been logically updated to the table 311 to indicate the new storage locations (i.e., 801 and 1000) of the modified objects (i.e., the objects 317 and 318).

That a modification of an object within the context of a transaction also affects another object may be explicitly indicated or determined, for example, by the I/O manager 235 or some other component of FIG. 2.

When two or more objects are involved in an update of a transaction, the objects are considered to be "atomically bound" as mentioned previously. In a recovery operation, unless changes are found in the store 250 for all objects changed in the context of the transaction, all of the changes found are discarded. In other words, if changes for one of the objects are found but changes for another of the objects are not found, the changes for the one of the objects are discarded.

To atomically bind two or more objects, in one embodiment, a pointer may be stored or otherwise associated with each object in the store 250. A pointer may indicate the storage location of another object (or portion thereof) involved in the transaction. If there are no additional objects involved in the transaction, the pointer may point to a "dead block" or indicate the storage location of a "head" object of another write plan. This head object may comprise a write plan, a modified object (or portion thereof) of the write plan, or the like.

Because a file system may be involved in many transactions, for performance reasons, it may be desirable to wait to request writing changes for the "last" object of a transaction that has completed until another transaction has completed. The last object of the transaction may be associated with a pointer that is to point to the "head" object of another write plan. The storage location of the "head" object may not be known, however, until another transaction completes. Therefore, to continue a chain of write plans, the "last" object in the write plan may not be written until the storage location is known for the head object of another write plan.

If a disk loses power or otherwise fails, before the "last" object of a transaction is written to non-volatile memory, the methodology above dictates that changes in the write plan are discarded. To avoid this result in systems where the frequency of transactions is low, in some embodiments, consistency components may wait until the earlier of 1) another transaction completing; 2) a timeout period elapsing before writing the "last" object together with its pointer to the next storage location; or 3) may always write the "last" object together with its pointer to the next storage location. In 2) and 3) above, the consistency components may determine a storage location for the "last" object to point to. This storage location may then have a pointer to point to the "head" object of another write plan. This storage location that the "last" object points to is sometimes referred to as the "dead block." In this manner, the loss of changes made during a transaction may be decreased.

In addition to pointers to next storage locations, data may also be stored in the store 250 to indicate the correct contents of the object "pointed" to. For example, a hash may be stored that indicates the correct content of a pointed to object.

In the example presented in FIG. 3, a pointer associated with the object 322 may point to a storage location associated with the object 323. The pointer binds the two objects together. If during recovery, either of the objects is not found or they do not have the correct content, the changes represented by found objects may be discarded.

Because of the nature of the store 250, there may be no guarantee as to which object will be written first to non-volatile memory of the store 250. If the object 322 is written first and the object 323 is not written, the pointer from object 322 will point to a storage location that may have spurious data. However, by computing a hash of the data at the storage location and comparing this hash with the hash stored with object 322, the consistency components may detect invalid data for the object 323. In this case, during recovery, the consistency components may discard the changes represented by the objects 322 and 323.

The recovery block 330 points to the first storage location (in this case 801) at which data was supposed to be stored after a checkpoint. The recovery block 330 may also include or be associated with a hash that is computed using the correct contents of the object stored at the first storage location.

During recovery, first, the last known good version of the object table is restored. The last known good version of the object table is the last logical object table that has been successfully stored in non-volatile memory of the store 250. Then, the write plans starting with the one pointed to by the recovery block 330 are examined.

Recall that a write plan is an intention to write all modified logical copies involved in a transaction to the store 250. The write plan may be encoded on the store via data that indicates the number of objects involved in the write plan together with links to storage locations of objects involved in the write plan. In one embodiment, the data that indicates the number of objects may be stored in the "head" object of a write plan, while the data that links to next storage locations may be stored with each element that is written to the store 250. In another embodiment, a data structure that includes the number of objects and links to the storage locations may be stored in one of the storage locations associated with the write plan (e.g., the "head" storage location) or separately from the storage locations. In another embodiment, the write plan may include only the next storage location.

In one embodiment, write plans that occur after a checkpoint may be written to a known location on non-volatile storage without having a "link" between write plans. In this embodiment, during recovery, a recovery manager may read each write plan from the known location and update the object table and other store data structures as appropriate if the writes indicated by the write plan are successful.

The examples above are not intended to be all-inclusive or exhaustive of the types of data structures that may be used to indicate elements of a write plan. Based on the teachings herein, those skilled in the art may recognize other data structures that may be used to indicate elements of a write plan without departing from the spirit or scope of aspects of the subject matter described herein.

As each write plan is examined, it is determined whether the objects of the write plan were successfully written to the store 250. This may be done, for example, by comparing the hash of the contents of each storage location associated with the write plan with the hash associated with the link to the location. If the hashes are equivalent for all objects of the write plan, the object table is updated to reflect the new location of the objects. If any of the hashes are not equivalent, recovery stops.

After recovery has ended, the object table has the locations of the root of all objects updated by successful write plans, where a successful write plan occurs when all objects associated with the plan have been successfully written to non-volatile memory of the disk.

Returning to FIG. 2, the API 215 may receive a request to modify an object involved in a transaction. In response, the I/O manager 235 may locate the object in a storage location (e.g., $L_1$) of the store, create a logical copy of the object, make changes to the object in the context of the transaction, determine a second storage location (e.g., $L_2$) for storing the logical copy as changed, send a request to write the logical copy as changed to the storage controller 240, and update a volatile data structure (e.g., the object table 310) to indicate that the logical copy is stored in the second storage location.

If the API 215 receives a request to modify another object involved in the transaction, the I/O manager 235 may perform additional actions, including creating an association (e.g., a write plan) that binds the another object and the first object together. Then, in conjunction with sending a request to write the modifications of the objects to storage, the I/O manager 235 may also send a request to write the association to the storage controller 240.

The checkpoint manager 230 may be operable to send a request to write the volatile data structure (e.g., the object table) to the storage controller 240 and to send a flush request to the storage controller 240. The flush request instructs the storage controller 240 to flush data from the volatile memory of the store 250 to the non-volatile memory of the store 250.

The recovery manager 225 may perform recovery actions previously described. In determining whether a pointed to location includes the correct content, the recovery manager 225 may determine whether the logical copy as changed was written to the second storage location based on comparing a stored hash of the logical copy as changed with a hash computed from content read from the second storage location. If the hashes are equivalent, the recovery manager may be further operable to update another data structure (e.g., an object table constructed from the last known good state) to indicate that the logical copy is stored in the second storage location. Allocated/free data structures on the store may also be updated to be consistent with the locations that are now known to be valid writes (e.g. because the write plan was successful).

Figure 4:
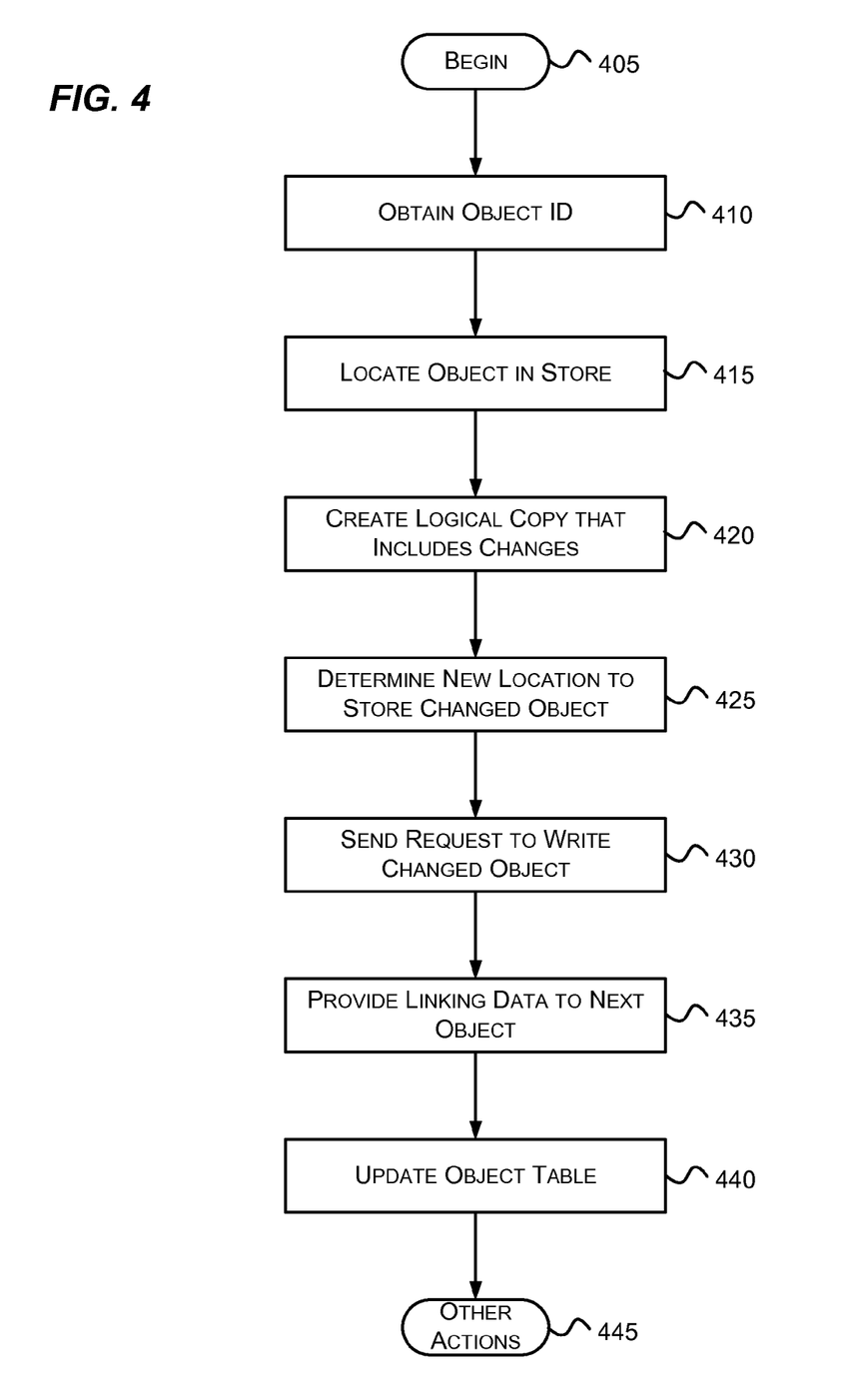
FIG. 4 is a flow diagram that generally represents exemplary actions that may occur when a single object is modified in the context of a transaction in accordance with aspects of the subject matter described herein.
Figure 5:
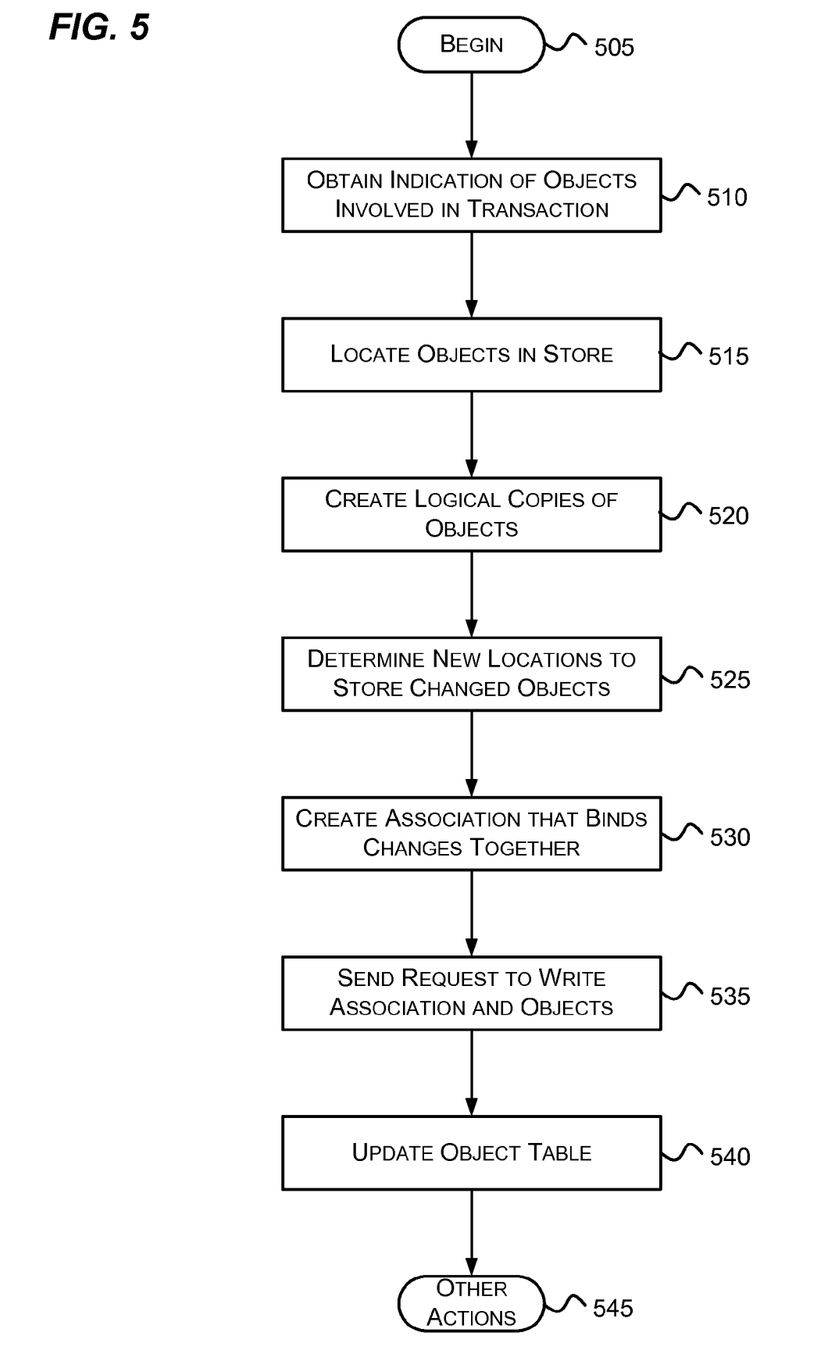
FIG. 5 is a flow diagram that generally represents exemplary actions that may occur when multiple objects are modified in the context of a transaction in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents exemplary actions that may occur when a single object is modified in the context of a transaction in accordance with aspects of the subject matter described herein. At block 405, the actions begin. For example, referring to FIGS. 2-3, the API 215 may receive a request to update data in the object 316.

At block 410, an indication of an object involved in an update of a transaction is received. For example, referring to FIGS. 2-3, the I/O manager 235 may receive the identifier 10 of the object 316.

At block 415, the object is located in a first storage location of a store. For example, referring to FIGS. 2-3, the I/O manager 235 may consult the object table 310 to determine the location 800 of the object 321. The object 321, for example, may correspond to a serialized representation of the object 316.

At block 420, a logical copy of the object is created that includes changes made to the object in the context of the transaction. For example, referring to FIG. 3, the logical copy (e.g., represented by object 317) is created and updated with the update specified in context of the transaction.

At block 425, a new location is determined for storing the updated logical copy. For example, referring to FIGS. 2-3, the I/O manager 235 may determine that the location 801 is to be used to store a serialized representation of the updated logical copy (e.g., represented by the object 317).

At block 430, a request to write the logical copy to the new location is sent to the storage controller. For example, referring to FIGS. 2-3, the I/O manager 235 sends a request to the storage controller 240 to write the object 317 to the location 801 of the store 250.

At block 435, linking data to the next location is provided. As described previously, this may involve sending data to the store that indicates a storage location of the head of changes made by another transaction or sending data that indicates a "dead block" that can be used to find changes made in the next transaction, if any. This linking data may be sent in the same request as the request to write the logical copy or in a different request. For example, referring to FIGS. 2-3, the I/O manager 235 may send a linking data 1000 that indicates that data updates made in context of another transaction may be stored starting at storage location 1000 of the store 250.

At block 440, the object table is updated to reflect that the logical copy of the object is requested to be stored at the new storage location. For example, referring to FIGS. 2-3, the I/O manager 235 may update the object table 310 so that the value for the object with ID 10 is updated to 801.

At block 445, other actions, if any, may be performed. For example, a request to write changes to the object table followed by a flush command may be sent to the storage controller. As another example, recovery actions may be performed. As described earlier, in one implementation, such actions may include, for example, locating a head of a linked list, iterating over the linked list until an object associated with a member of the linked list is found that was not written to the store, in conjunction with iterating over the linked list updating an object table to indicate new locations for objects.

FIG. 5 is a flow diagram that generally represents exemplary actions that may occur when multiple objects are modified in the context of a transaction in accordance with aspects of the subject matter described herein. At block 505, the actions begin. For example, referring to FIGS. 2-3, the API 215 may receive a request to update a name of a file. Updating a name of a file may involve updating data structures of a directory, for example.

At block 510, one or more indications of objects involved in a transaction are obtained. For example, referring to FIGS. 2-3, the I/O manager 235 may receive the identifier 10 of the object 316 as well as a request to change the name of a file corresponding to the object 316. Because the name of the file is changed, the I/O manager 235 (or another component) may determine that a directory (e.g., a directory corresponding to the object 318 is also involved in the transaction. The ID of the directory (11) may also be obtained.

At block 515, the locations of the objects are located in a store. For example, referring to FIGS. 2-3, the I/O manager 235 may consult the object table 310 to determine the locations 1500 and 800 of the objects 319 and 321, respectively. The object 321, for example, may correspond to a serialized representation of the object 316, while the object 319 may correspond to a serialized representation of the object 314.

At block 520, logical copies are created of the objects that are modified in context of the transaction. For example, referring to FIG. 3, the logical copies (e.g., represented by objects 317 and 318) are created and updated with the updates specified in context of the transaction.

At block 525, new locations are determined to store the changed object. For example, referring to FIGS. 2-3, the I/O manager 235 may determine that the location 801 is to be used to store a serialized representation of the updated logical copy of the file (represented by the object 317) while location 1000 is to be used to store a serialized representation of the updated logical copy of the directory (represented by the object 318).

At block 530, an association is created that binds the logical copies of the objects in an atomic unit. For example, a write plan that links the logical copies may be created. For example, referring to FIGS. 2-3, the I/O manager 235 may create a write plan that links the objects 317 and 318. As another example, a linked list that includes references between storage locations together with hash values may be created. As mentioned previously, these hash values may be indicative of correct content the logical copies involved in the request to write.

At block 535, the request is sent to write the association and objects to the store. As mentioned previously, this request is to make new copies and maintain original of the objects on the store. For example, referring to FIGS. 2-3, the I/O manager 235 may send a request to the storage controller 240 to write the write plan together with the objects 317-318 to the store 250.

As another example, sending the request to write the association and objects may involve sending one or more requests to write a data structure that indicates each storage location for the logical copies, one or more requests to write all but one of the logical copies to the store, and waiting to send a request to write the one of the logical copies until a predetermined event occurs such as until another transaction has completed, until a predetermined time period has elapsed, and until a checkpoint is reached. If another transaction completes, additional actions may be performed, including sending a request to write the "last" logical copies together with a reference to storage location of a logical copy of an object modified in a context of the another transaction.

At block 540, the object table is updated. For example, referring to FIG. 3, the object table 310 may be updated with new locations to create the object table 311.

At block 545, other actions, if any, may be performed. For example, recovery actions may be performed. These recovery actions may include:

1. Obtaining a first data structure that indicates last known correct storage locations of objects in a non-volatile store;

2. Obtaining another data structure that indicates storage locations of the non-volatile store where the logical copies were planned to be stored. This data structure also indicating a first set of hashes indicative of correct contents of the logical copies;

3. Reading content located at the storage locations;

4. Computing a second set of hashes of the content;

5. If corresponding members of the first and second set of hashes are equivalent, updating the first data structure to indicate that the logical copies are stored at the storage locations and repeating the steps 1-5 above for a next set of updated local copies, if any, stored on the store; and 6. If any of the corresponding members of the first and second set of hashes are not equivalent, ending the recovery actions.

Another exemplary action that may occur includes indicating that storage locations associated with the originals of the objects are available for use after successfully flushing all logical copies to a non-volatile memory of the store.

These other exemplary actions are not intended to be all-inclusive or exhaustive of actions that may occur and are given here merely to be illustrative of some other actions that may occur.

As can be seen from the foregoing detailed description, aspects have been described related to maintaining consistency in a storage system. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    obtaining one or more indications of objects that are modified in context of a transaction;
    creating, by the computer, logical copies of the objects that are modified in the context of the transaction while maintaining originals of the objects on a store;
    indicating that storage locations associated with the originals of the objects are available for use;
    indicating that storage locations associated with the logical copies are valid after successfully flushing all logical copies to a non-volatile memory of the store;
    creating a write plan that indicates an intention of where on the store the logical copies are to be written, the write plan including a value indicative of correct content of one or more of the logical copies; and
    sending a request to write the write plan to the store.

2. The method of claim 1, wherein creating logical copies of the objects comprises creating copies of portions of the objects that are modified during the transaction.

3. The method of claim 2, where the creating logical copies of the objects further comprises creating a first set of pointers that refer to the portions of the objects that are modified during the transaction and creating a second set of pointers that refer to non-changed portions of the objects that are modified during the transaction, the first set of pointers and the second set of pointers usable to reference the portions that are modified and the non-changed portions to construct the objects as modified.

4. The method of claim 1, further comprising locating a first set of storage locations of the store for the objects that are involved in the transaction by using identifiers of the objects as keys in a lookup table that associates the keys with locations at which the objects are stored in the store.

5. The method of claim 1, where creating the write plan comprises creating a linked list that references each of the objects.

6. The method of claim 5, where the creating the linked list comprises creating links between pairs of the logical copies, each link including a hash value indicative of correct content of at least one of the logical copies of the pairs.

7. The method of claim 1, further comprising sending one or more requests to write all but one of the logical copies to the store, and waiting to send a request to write the one of the logical copies until a predetermined event occurs.

8. The method of claim 7, where the waiting to send the request to write the one of the logical copies until a predetermined event occurs comprises waiting for one or more of: until another transaction has completed, until a predetermined time period has elapsed, and until a checkpoint is reached.

9. The method of claim 8, further comprising sending a request to write the one of the logical copies together with a reference to a storage location of a logical copy of an object modified in a context of the another transaction.

10. The method of claim 1, further comprising performing recovery actions, comprising:
    obtaining a first data structure that indicates last known correct storage locations of objects in a non-volatile store;
    obtaining another data structure that indicates storage locations of the non-volatile store where the write plan indicates that the logical copies were to be written, the another data structure also indicating a first set of hashes indicative of correct contents of the logical copies;
    reading content located at the storage locations;
    computing a second set of hashes of the content;
    if corresponding members of the first and second set of hashes are equivalent, updating the first data structure to indicate that the logical copies are stored at the storage locations; and
    if any of the corresponding members of the first and second set of hashes are not equivalent, ending the recovery actions.

11. At least one computer storage device storing computer-executable instructions, which when executed perform actions, comprising:
    obtaining an indication of an object involved in an update of one or more transactions;
    locating the object in a first storage location of a store;
    creating a logical copy of the object that includes changes made to the object in context of the one or more transactions;
    determining a second storage location of the store for storing the logical copy;
    sending a request to write a write plan to the store, the write plan indicating an intention of writing the logical copy as changed to the second storage location, the write plan including a value indicative of correct content of the logical copy as changed;
    sending a request to write the logical copy as changed to the second storage location;
    in conjunction with sending the request, providing data that indicates a next location at which a logical copy pertaining to another transaction, if any, is to be written;
    updating a volatile data structure to indicate that the logical copy is stored in the second storage location;
    sending a request to write changes to the updated volatile data structure to the store; and
    sending, to the store in conjunction with the sending the request to write the changes, a flush command that instructs a controller of the store to write cache associated with the store to non-volatile memory of the store.

12. The at least one computer storage device of claim 11, where the locating the object in a first storage location of a store comprises receiving an identifier of the object and using the identifier to look up an association in a data structure that associates identifiers with storage locations.

13. The at least one computer storage device of claim 11, further comprising updating the volatile data structure to indicate a storage location of the store of changes made in context of another transaction after sending the request to write changes to the volatile data structure to the store.

14. The at least one computer storage device of claim 11, further comprising performing recovery actions, comprising:
    locating a head of a linked list, each member of the linked list associated with a logical copy that was to be written to a location of the store specified by the linked list;
    iterating over the linked list until a member of the linked list is associated with a logical copy that was not written to the location associated with the member; and
    in conjunction with iterating over the linked list, for each member for which a logical copy was written to the location specified by the member, updating a data structure to indicate a new location for an object associated with the logical copy.

15. In a computing environment, a system, comprising:
    an interface operable to receive a request to modify an object involved in a transaction;

a store having a non-volatile memory and a volatile memory thereon;

a storage controller that allows writes to the non-volatile memory to proceed in an order other than an order in which requests for the writes were received;

an I/O manager operable to perform actions, comprising:
  locating the object in a first storage location of the store,
  creating a logical copy of the object that includes changes made to the object in context of the transaction,
  determining a second storage location of the store for storing the logical copy,
  sending a request to write a write plan to the store, the write plan indicating an intention of writing the logical copy as changed to the second storage location, the write plan including a value indicative of correct content of the logical copy as changed,
  sending a request to write the logical copy as changed to the second storage location, and
  updating a volatile data structure to indicate that the logical copy as changed is stored in the second storage location; and a checkpoint manager operable to send a request to write the volatile data structure to the storage controller and to send a flush request to the storage controller, the flush request instructing the storage controller to flush data from the volatile memory of the store to the non-volatile memory of the store.

16. The system of claim 15, wherein the interface is further operable to receive a request to modify another object involved in the transaction and wherein the I/O manager is further operable to perform additional actions, comprising:
  creating an association that binds the another object and the object together; and
  in conjunction with sending a request to write the logical copy as changed to the second storage location sending a request to write the association to the storage controller.

17. The system of claim 15, further comprising a recovery manager operable to determine whether the logical copy as changed was written to the second storage location based on comparing a stored hash of the logical copy as changed with a hash computed from content read from the second storage location, the recovery manager further operable to update another data structure to indicate that the logical copy is stored in the second storage location if the hashes are equivalent.

* * * * *